United States Patent
Hecht

(10) Patent No.: US 8,813,617 B2
(45) Date of Patent: Aug. 26, 2014

(54) CUTTING INSERT AND CUTTING TOOL

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 660 days.

(21) Appl. No.: 13/027,010

(22) Filed: Feb. 14, 2011

(65) Prior Publication Data

US 2011/0200402 A1 Aug. 18, 2011

(30) Foreign Application Priority Data

Feb. 17, 2010 (IL) .......................... 204,009

(51) Int. Cl.
| | |
|---|---|
| B23B 27/10 | (2006.01) |
| B23B 29/02 | (2006.01) |
| B23B 27/00 | (2006.01) |
| B23B 27/14 | (2006.01) |
| B23B 29/04 | (2006.01) |

(52) U.S. Cl.
CPC ............... *B23B 27/10* (2013.01); *B23B 27/007* (2013.01); *B23B 2250/12* (2013.01); *B23B 27/14* (2013.01); *B23B 29/04* (2013.01)
USPC ................. 82/158; 407/11; 407/102; 408/57; 408/226

(58) Field of Classification Search
USPC .................. 407/11, 102; 408/56, 57, 59, 226; 82/158, 161
See application file for complete search history.

(56) References Cited

U.S. PATENT DOCUMENTS

| | | | |
|---|---|---|---|
| RE24,924 E | | 1/1961 | Willingham |
| 4,840,519 A | * | 6/1989 | Kleine ........................ 408/226 |
| 2002/0057950 A1 | | 5/2002 | Hecht |
| 2004/0052592 A1 | | 3/2004 | Oettle |
| 2010/0086373 A1 | * | 4/2010 | Kleiner ........................ 408/1 R |

FOREIGN PATENT DOCUMENTS

| | | | | |
|---|---|---|---|---|
| CN | 2778440 Y | | 5/2006 | |
| DE | 19831743 A1 | | 3/1999 | |
| DE | 10145667 A1 | | 3/2003 | |
| DE | 102007023167 A1 | * | 11/2008 | ............. B23D 77/00 |
| EP | 1200220 A1 | | 5/2002 | |
| FR | 1204090 A | | 1/1960 | |
| GB | 766351 A | | 1/1957 | |
| GB | 2 228 695 | | 9/1990 | |
| JP | 2005238370 A | * | 9/2005 | |
| WO | WO 2008/141605 A3 | * | 11/2008 | ............. B23D 77/00 |

OTHER PUBLICATIONS

International Search Report dated May 12, 2011 issued in corresponding International Application No. PCT/IL2011/000072.
Official Action dated Mar. 13, 2014 issued in Chinese counterpart application (No. 201180009833.9) with translation.

* cited by examiner

*Primary Examiner* — Daniel Howell
(74) *Attorney, Agent, or Firm* — Womble Carlyle

(57) ABSTRACT

A cutting insert has a longitudinal insert axis A, a cutting head and an insert shank which extends rearwardly from the cutting head. The insert shank includes an insert clamping portion with an asymmetric cross section taken perpendicular to the insert axis A. The insert shank has a peripheral surface extending along at least a portion of the total length of the insert shank. The cutting insert has a first dividing plane P1 which contains the insert axis A. The first dividing plane P1 may be parallel to a line L which extends along the longest cross-sectional dimension of the insert clamping portion 40. On one side of the first dividing plane P1, the peripheral surface comprises first and second longitudinally extending depressions. On the other side of the first dividing plane P1, the peripheral surface comprises first and second abutment surfaces separated by a third depression, the first and second depressions being separated by a third abutment surface.

22 Claims, 2 Drawing Sheets

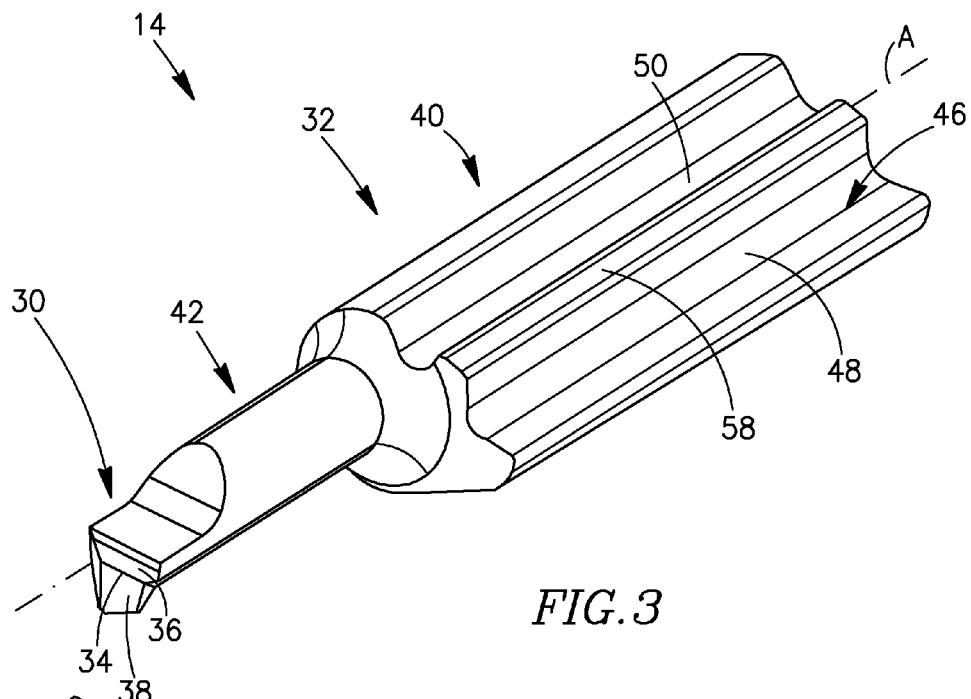
FIG.3
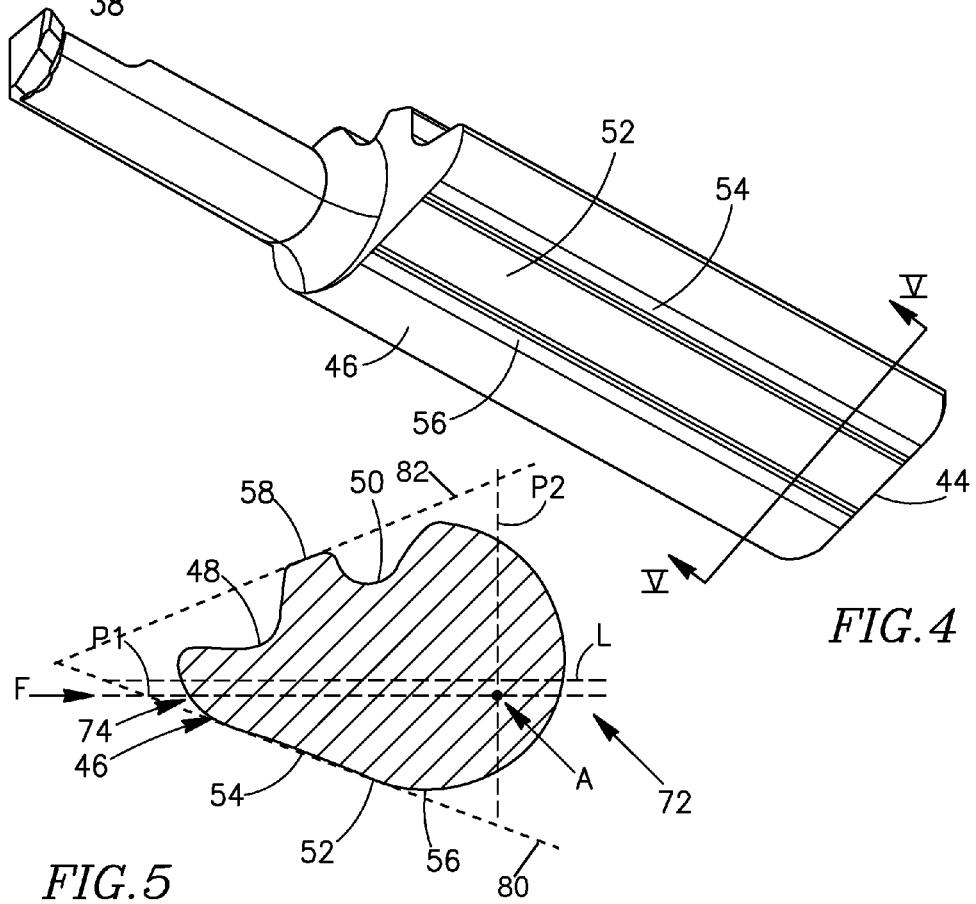
FIG.4
FIG.5

US 8,813,617 B2

CUTTING INSERT AND CUTTING TOOL

FIELD OF THE INVENTION

The present invention relates to cutting inserts for metal cutting tools provided with built-in coolant channels.

BACKGROUND OF THE INVENTION

GB2228695 discloses an internal turning tool having a hook tool clampable in a receiving recess of a clamping holder. The receiving recess is provided with clamping surfaces which converge radially outwards from a longitudinal axis of the receiving recess. A chucked end of a shaft of the hook tool is provided with a radial projection projecting from the periphery of the shaft. The projection has outwardly converging abutment surfaces formed to abut the clamping surfaces of the receiving recess. The hook tool is also provided with a coolant bore formed internally within the radial projection.

SUMMARY OF THE INVENTION

In accordance with the present invention there is provided a cutting insert having a longitudinal insert axis A and comprising a cutting head and an insert shank extending rearwardly from the cutting head. The cutting head comprises a cutting edge formed at an intersection of a rake surface and a relief surface. The insert shank comprises an insert clamping portion extending along the insert axis A and having a peripheral surface surrounding the insert axis A. The insert axis A is located in a first dividing plane P1 of the insert clamping portion, the insert clamping portion has an asymmetric cross section taken perpendicular to the insert axis A. On one side of the first dividing plane P1, the peripheral surface comprises first and second longitudinally extending depressions; and on the other side of the first dividing plane P1, the peripheral surface comprises first and second abutment surfaces separated by a third depression, the first and second depressions being separated by a third abutment surface.

According to embodiments of the present invention, the depressions and abutment surfaces are located on one side of a second dividing plane P2 of the insert clamping portion, the second dividing plane P2 being perpendicular to the first dividing plane P1.

According to embodiments of the present invention, the insert shank comprises an intermediate portion which extends between the cutting head and the insert clamping portion.

According to embodiments of the present invention, the intermediate portion is smaller in width than the insert clamping portion.

According to embodiments of the present invention, the abutment surfaces are flat.

According to embodiments of the present invention, the abutment surfaces have a convex shape, in a cross section taken perpendicular to the insert axis A.

According to embodiments of the present invention, the first and second abutment surfaces are co-planar.

According to embodiments of the present invention, the first and second abutment surfaces, and the third abutment surface converge in an outward radial direction.

In accordance with the present invention, there is provided a cutting tool comprising the cutting insert which is located in a tool holder, wherein the first and second depressions form coolant channels with a clamping surface of the holder.

BRIEF DESCRIPTION OF THE DRAWINGS

For a better understanding of the present invention and to show how the same may be carried out in practice, reference will now be made to the accompanying drawings, in which:

FIG. 3 is an isometric top view of the cutting insert of FIG. 1.

FIG. 4 is an isometric bottom view of the cutting insert of FIG. 1; and

FIG. 5 is a cross-section taken in a plane indicated by line V-V of FIG. 4.

Figure 1:
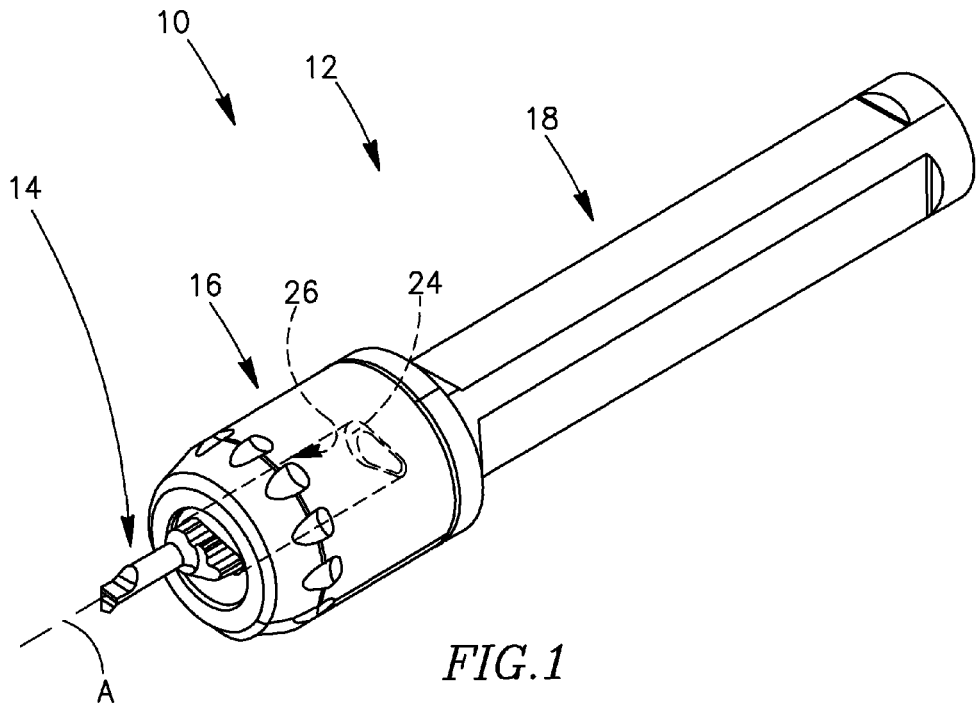
FIG. 1 is an isometric view of a cutting tool having a cutting insert clamped therein, according to embodiments of the present invention.
Figure 2:
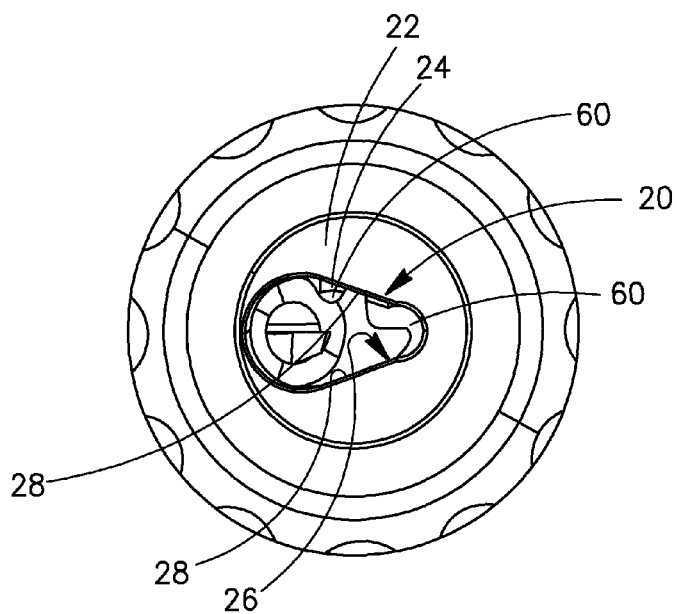
FIG. 2 is an end view of the cutting tool of FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is made to FIG. 1 showing a cutting tool 10. The cutting tool 10 includes a longitudinal holder 12 and a longitudinal cutting insert 14. The cutting insert 14 is releasably clampable in a holder clamping portion 16 at a forward end of the holder 12. The holder 12 includes a holder shank 18 which extends rearwardly from the holder clamping portion 16. According to some embodiments, the holder clamping portion 16 may include any desired clamping means, by which the cutting insert 14 may be secured in said holder clamping portion 16. For example, the clamping means may be a clamping screw.

The holder clamping portion 16 has a clamping bore 20 which opens out to a front surface 22 of the holder clamping portion 16. According to some embodiments, the clamping bore 20 may be a blind bore and may have a clamping bore rear surface 24. The clamping bore 20 has a longitudinal clamping surface 26 extending between the clamping bore rear surface 24 and the front surface 22. According to some embodiments, the clamping bore rear surface 24 is used as a stopper for the cutting insert 14. According to some embodiments, the clamping bore 20 has a pear shaped cross section and two minor clamping surfaces 28 which converge in an outward radial direction. The two minor clamping surfaces 28 are formed to engage given surfaces of the cutting insert 14.

Attention is now drawn to FIGS. 2-5. The cutting insert 14 includes a cutting head 30 and an insert shank 32 extending rearwardly from the cutting head 30. The cutting insert 14 has a longitudinal insert axis A, passing through the insert shank 32 and the cutting head 30. The cutting head 30 has a cutting edge 34 formed at an intersection of a rake surface 36 and a relief surface 38. The insert shank 32 includes an insert clamping portion 40 at a rearward end thereof. The insert clamping portion 40 extends along the insert axis A. According to some embodiments, the insert shank 32 includes an intermediate portion 42 connecting between the cutting head 30 and the insert clamping portion 40. According to some embodiments, the intermediate portion 42 is smaller in width than the insert clamping portion 40.

The insert clamping portion 40 includes an insert rear surface 44, a peripheral surface 46 surrounding the insert axis A and has an asymmetrical cross section, taken perpendicularly to the insert axis A (see FIG. 5), where the clamping portion 40 is rotationally asymmetric about the insert axis A and any axis parallel thereto. According to some embodiments, the peripheral surface 46 extends between the intermediate portion 42 and the insert rear surface 44.

The insert clamping portion 40 has a longitudinal first dividing plane P1 which passes through the cutting head 30 and the insert clamping portion 40. In some embodiments, the dividing plane P1 is parallel to a line L which extends along the longest cross-sectional dimension of the insert clamping portion 40 (See FIG. 5). The insert axis A is located in the first dividing plane P1. On one side of the dividing plane P1, the peripheral surface 46 includes longitudinal first and second depressions (48, 50). On the other side of the dividing plane P1, the peripheral surface 46 includes longitudinal first and second abutment surfaces (54, 56). The first and second abutment surfaces (54, 56) are separated by a third depression 52 and the first and second depressions (48, 50) are separated by a third abutment surface 58. As seen in FIG. 5, the first and second longitudinally extending depressions (48, 50) and third abutment surface (58) are located entirely on one side of the first dividing plane (P1), and the first and second abutment surfaces (54, 56) and the third depression (52) are located entirely on the other side of the first dividing plane (P1).

According to some embodiments, the abutment surfaces (54, 56, 58) may have a convex shape in a cross section taken perpendicularly to the insert axis A, or alternatively, they may be flat. According to some embodiments, the first and second abutment surfaces (54, 56) are co-planar. According to some embodiments and as seen in FIG. 5, in a cross-section of the insert clamping portion (40), a first line (80) tangential to the coplanar first and second abutment surfaces (54, 56) and a second line (82) tangential to the third abutment surface (58) converge in an outward radial direction.

The cutting insert 14 is typically made of extremely hard and wear-resistant material such as cemented carbide, either by form-pressing or by injection molding and sintering carbide powders in a binder. The cemented carbide may be, for example, tungsten carbide. The cutting insert 14 may be coated or uncoated.

As seen in FIG. 5, the cross-section of the insert clamping portion 40 has a large end 72 and a narrow end 74. The first dividing plane P1 generally intersects both ends 72, 74. The insert clamping portion 40 has a second dividing plane P2, perpendicular to the first dividing plane P1 and containing the longitudinal insert axis A. In some embodiments, all of the abutment surfaces (54, 56, 58) and depressions (48, 50, 52) of the peripheral surface 46 are located entirely on the side of the second dividing plane P2 associated with the narrow end 74.

When the cutting insert 14 is securely clamped in the cutting tool 10, each of the first and second depressions (48, 50) forms a longitudinal coolant channel 60 with the clamping surface 26 of the clamping bore 20.

In an end view of the cutting tool 10 (FIG. 2), it can be seen that the abutment surfaces (54, 56, 58) of the insert clamping portion 40 abut the clamping surface 26 of the clamping bore 20, forming a three-point abutment arrangement. This ensures accurate locating of the cutting insert 14 in the clamping bore 20. A clamping force F is exerted on the clamping portion of the cutting insert 14 by a clamping screw or any desired clamping device as mentioned hereinabove. The clamping force F is exerted in a direction generally parallel to the first dividing plane P1 and perpendicular to the insert axis A (see FIG. 5).

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting insert (14) having a longitudinal insert axis (A) and comprising a cutting head (30) and an insert shank (32) extending rearwardly from the cutting head (30);
    the cutting head (30) comprising a cutting edge (34) formed at an intersection of a rake surface (36) and a relief surface (38);
    the insert shank (32) comprising an insert clamping portion (40) extending along the insert axis (A) and having a peripheral surface (46) surrounding the insert axis (A), the insert axis (A) being located in a first dividing plane (P1) of the insert clamping portion (40), the insert clamping portion (40) being rotationally asymmetric about insert axis A and any axis parallel thereto;
    wherein:
    on one side of the first dividing plane (P1), the peripheral surface (46) comprises first and second longitudinally extending depressions (48, 50); and
    on the other side of the first dividing plane (P1), the peripheral surface (46) comprises first and second abutment surfaces (54, 56) separated by a third depression (52), the first and second depressions (48, 50) being separated by a third abutment surface (58).

2. The cutting insert (14) according to claim 1, wherein the insert shank (32) comprises an intermediate portion (42) which extends between the cutting head (30) and the insert clamping portion (40).

3. The cutting insert (14) according to claim 2, wherein the depressions (48, 50, 52) and abutment surfaces (54, 56, 58) are located on one side of a second dividing plane (P2) of the insert clamping portion (40), the second dividing plane (P2) being perpendicular to the first dividing plane (P1) and containing the insert axis (A).

4. The cutting insert (14) according to claim 3, wherein the intermediate portion (42) is smaller in width than the insert clamping portion (40).

5. The cutting insert (14) according to claim 3, wherein the abutment surfaces (54, 56, 58) are flat.

6. The cutting insert (14) according to claim 3, wherein the abutment surfaces (54, 56, 58) have a convex shape, in a cross section taken perpendicular to the insert axis (A).

7. The cutting insert (14) according to claim 3, wherein the first and second abutment surfaces (54, 56) are co-planar.

8. The cutting insert (14) according to claim 7, wherein, in a cross-section of the insert clamping portion, a first tangential line to the first and second abutment surfaces (54, 56), and a second tangential line to the third abutment surface (58) converge.

9. A cutting insert (14) having a longitudinal insert axis (A) and comprising a cutting head (30) and an insert shank (32) extending rearwardly from the cutting head (30);
    the cutting head (30) comprising a cutting edge (34) formed at an intersection of a rake surface (36) and a relief surface (38);

the insert shank (32) comprising an insert clamping portion (40) extending along the insert axis (A) and having a peripheral surface (46) surrounding the insert axis (A), the insert clamping portion (40) being rotationally asymmetric about the insert axis (A) and any axis parallel thereto, the insert axis (A) being located in a first dividing plane (P1) of the insert clamping portion (40), the first dividing plane (P1) being parallel to a line (L) which extends along the longest cross-sectional dimension of the insert clamping portion (40), wherein:

on one side of the first dividing plane (P1), the peripheral surface (46) comprises first and second longitudinally extending depressions (48, 50); and on the other side of the first dividing plane (P1), the peripheral surface (46) comprises first and second abutment surfaces (54, 56) separated by a third depression (52), the first and second depressions (48, 50) being separated by a third abutment surface (58).

10. The cutting insert (14) according to claim 9, wherein the insert shank (32) comprises an intermediate portion (42) which extends between the cutting head (30) and the insert clamping portion (40).

11. The cutting insert (14) according to claim 10, wherein the depressions (48, 50, 52) and abutment surfaces (54, 56, 58) are located on one side of a second dividing plane (P2) of the insert clamping portion (40), the second dividing plane (P2) being perpendicular to the first dividing plane (P1) and containing the insert axis (A).

12. The cutting insert (14) according to claim 11, wherein the intermediate portion (42) is smaller in width than the insert clamping portion (40).

13. The cutting insert (14) according to claim 11, wherein the abutment surfaces (54, 56, 58) are flat.

14. The cutting insert (14) according to claim 11, wherein the abutment surfaces (54, 56, 58) have a convex shape, in a cross section taken perpendicular to the insert axis (A).

15. The cutting insert (14) according to claim 11, wherein the first and second abutment surfaces (54, 56) are co-planar.

16. The cutting insert (14) according to claim 15, wherein in a cross-section of the insert clamping portion, a first tangential line to the first and second abutment surfaces (54, 56), and a second tangential line to the third abutment surface (58) converge.

17. A cutting tool (10) comprising:

a tool holder (12) having a clamping surface (26); and a cutting insert (14) located in the tool holder (12), the cutting insert (14) having first and second depressions (48, 50) formed on a peripheral surface (46) thereof, the first and second depressions of the cutting insert forming coolant channels (60) with the clamping surface (26) of the tool holder (12); wherein:

the cutting insert is in accordance with the cutting insert of claim 1.

18. The cutting insert (14) according to claim 1, wherein:

the first and second longitudinally extending depressions (48, 50) and third abutment surface (58) are located entirely on one side of the first dividing plane (P1); and the first and second abutment surfaces (54, 56) and the third depression (52) are located entirely on the other side of the first dividing plane (P1).

19. The cutting insert (14) according to claim 1, wherein:

an asymmetric cross section of the insert clamping portion (40) taken perpendicular to the insert axis (A) comprises a large end (72) and a narrow end (74);

the first dividing plane (P1) of the insert clamping portion (40) intersects both ends (72, 74);

the insert clamping portion (40) has a second dividing plane (P2), perpendicular to the first dividing plane (P1) and containing the longitudinal insert axis (A); and the first, second and third abutment surfaces (54, 56, 58) and the first, second and third depressions (48, 50, 52) of the peripheral surface (46) are located entirely on the side of the second dividing plane (P2) associated with the narrow end (74).

20. The cutting insert (14) according to claim 9, wherein:

the first and second longitudinally extending depressions (48, 50) and third abutment surface (58) are located entirely on one side of the first dividing plane (P1); and the first and second abutment surfaces (54, 56) and the third depression (52) are located entirely on the other side of the first dividing plane (P1).

21. The cutting insert (14) according to claim 9, wherein:

an asymmetric cross section of the insert clamping portion (40) taken perpendicular to the insert axis (A) comprises a large end (72) and a narrow end (74);

the first dividing plane (P1) of the insert clamping portion (40) intersects both ends (72, 74);

the insert clamping portion (40) has a second dividing plane (P2), perpendicular to the first dividing plane (P1) and containing the longitudinal insert axis (A); and the first, second and third abutment surfaces (54, 56, 58) and the first, second and third depressions (48, 50, 52) of the peripheral surface (46) are located entirely on the side of the second dividing plane (P2) associated with the narrow end (74).

22. A cutting insert (14) having a longitudinal insert axis (A) and comprising a cutting head (30) and an insert shank (32) extending rearwardly from the cutting head (30);

the cutting head (30) comprising a cutting edge (34) formed at an intersection of a rake surface (36) and a relief surface (38);

the insert shank (32) comprising an insert clamping portion (40) extending along the insert axis (A) and having a peripheral surface (46) surrounding the insert axis (A), the insert axis (A) being located in a first dividing plane (P1) of the insert clamping portion (40), the insert clamping portion (40) being rotationally asymmetric about the insert axis (A) and any axis parallel thereto;

wherein the peripheral surface (46) comprises:

first and second longitudinally extending depressions (48, 50) located entirely on one side of the first dividing plane (P1);

first and second abutment surfaces (54, 56) located entirely on the other side of the first dividing plane (P1), the first and second abutment surfaces (54, 56) being separated by a third longitudinally extending depression (52); and a third abutment surface (58) located entirely on said one side of the first dividing plane (P1) and between the first and second longitudinally extending depressions (48, 50).

\* \* \* \* \*